United States Patent
Chen et al.

(10) Patent No.: US 10,911,163 B2
(45) Date of Patent: Feb. 2, 2021

(54) LOCATING PASSIVE INTERMODULATION FAULT SOURCES

(71) Applicant: Ranplan Wireless Network Design Ltd, Cambridge (GB)

(72) Inventors: Jiming Chen, Cambridge (GB); Hui Song, Cambridge (GB); Zhihua Lai, Cambridge (GB); Jie Zhang, Cambridge (GB)

(73) Assignee: RANPLAN WIRELESS NETWORK DESIGN LTD, Cambridge (GB)

( * ) Notice: Subject to any disclaimer, the term of this patent is extended or adjusted under 35 U.S.C. 154(b) by 0 days.

(21) Appl. No.: 16/494,757

(22) PCT Filed: Mar. 16, 2018

(86) PCT No.: PCT/GB2018/050688
§ 371 (c)(1),
(2) Date: Sep. 16, 2019

(87) PCT Pub. No.: WO2018/167509
PCT Pub. Date: Sep. 20, 2018

(65) Prior Publication Data
US 2020/0106534 A1    Apr. 2, 2020

(30) Foreign Application Priority Data

Mar. 16, 2017 (GB) .................................. 1704221.9

(51) Int. Cl.
*H04B 17/00* (2015.01)
*H04B 17/20* (2015.01)
(Continued)

(52) U.S. Cl.
CPC ......... *H04B 17/17* (2015.01); *H04B 17/3912* (2015.01)

(58) Field of Classification Search
None
See application file for complete search history.

(56) References Cited

U.S. PATENT DOCUMENTS

2010/0164504 A1  7/2010  Bradley
2010/0188239 A1  7/2010  Rockwell
(Continued)

FOREIGN PATENT DOCUMENTS

| WO | WO-00/57571 A1 | 9/2000 |
| WO | WO-2012/009757 A1 | 1/2012 |
| WO | WO-2013/088278 A1 | 6/2013 |

OTHER PUBLICATIONS

Combined Search and Examination Report issued in GB Application No. 1704221.9, dated Oct. 18, 2017. 8 pages.
(Continued)

*Primary Examiner* — Gary Lafontant
(74) *Attorney, Agent, or Firm* — Mintz Levin Cohn Ferris Glovsky and Popeo, P.C.

(57) ABSTRACT

A method for locating the source of a passive intermodulation (PIM) fault in a radio frequency (RF) system, the method comprising: a) generating a PIM fault fingerprint database by: modelling an RF network; defining a plurality of PIM fault patterns for the modelled RF network by defining PIM faults at one or more sources; simulating a received RF signal for each respective PIM fault pattern; generating the PIM fault fingerprint database in dependence on the simulated received RF signals for each defined PIM fault pattern; b) measuring an RF signal for a real network having a PIM fault and abstracting the measured RF signal to define a given signal; c) searching and matching the given signal using the fingerprint database to determine the PIM fault pattern; and d) locating the source of the PIM fault, or (Continued)

giving a further measuring guideline in dependence on the determined PIM fault pattern.

18 Claims, 5 Drawing Sheets

(51) Int. Cl.
    *H04B 17/17*     (2015.01)
    *H04B 17/391*     (2015.01)

(56) References Cited

U.S. PATENT DOCUMENTS

| | | |
|---|---|---|
| 2011/0194597 A1 | 8/2011 | Wolcott et al. |
| 2014/0002097 A1 | 1/2014 | Yagi |
| 2016/0157115 A1 | 6/2016 | Kim et al. |
| 2018/0219636 A1* | 8/2018 | Gale .................. G01R 29/0814 |

OTHER PUBLICATIONS

International Search Report issued in International Patent Application No. PCT/GB2018/050688, dated Jun. 15, 2018 (Jun. 15, 2018). 2 pages.

* cited by examiner

LOCATING PASSIVE INTERMODULATION FAULT SOURCES

CROSS REFERENCE TO RELATED APPLICATIONS

This application is a National Phase filing of PCT/GB2018/050675 filed 15 Mar. 2018 entitled: WIFI MULTI-BAND FINGERPRINT-BASED INDOOR POSITIONING, which claims priority to GB1704216.9 filed 16 Mar. 2017 entitled WIFI MULTI-BAND FINGERPRINT-BASED INDOOR POSITIONING, which the disclosure of which is incorporated herein by reference.

FIELD OF THE INVENTION

This invention relates to a method for locating passive intermodulation (PIM) source fault in a radio frequency (RF) transmission and receiving system. The present invention generally relates to wireless communications and more particularly relates to measuring passive intermodulation (PIM) and identifying the location of a source of measured PIM.

TECHNICAL BACKGROUND

Figure 1:
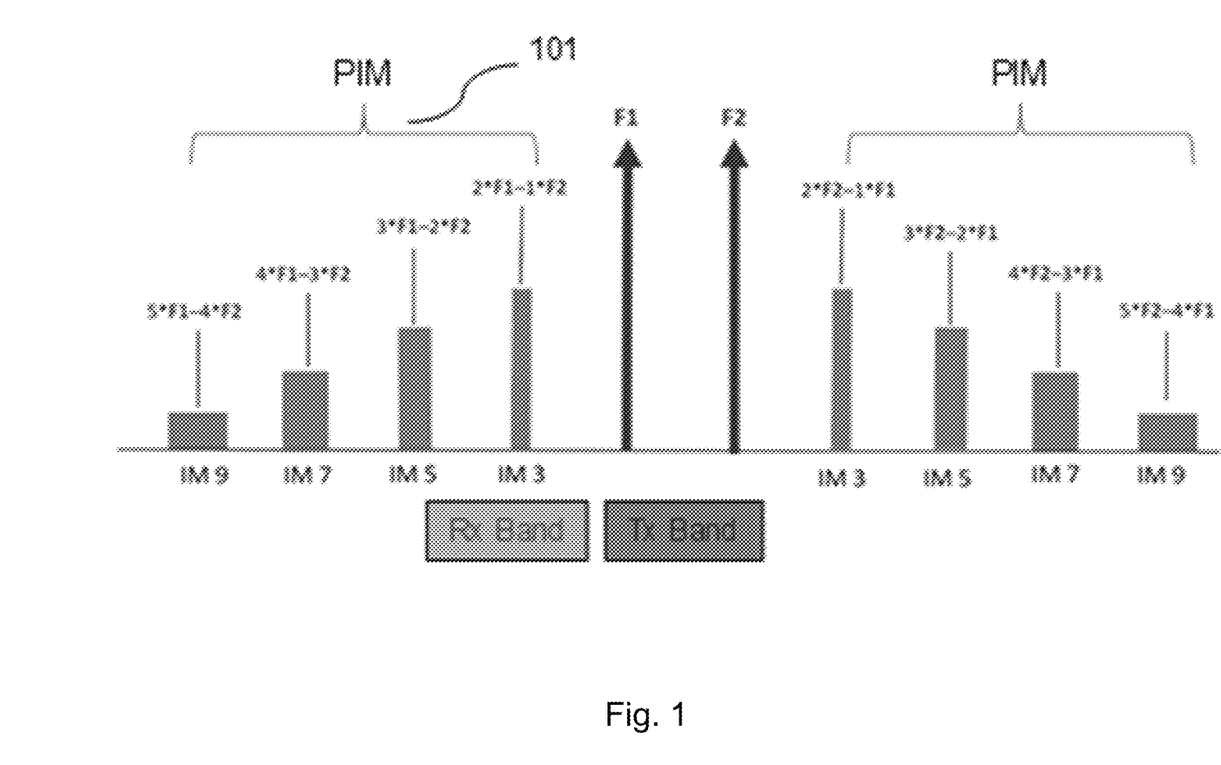
FIG. 1 shows the mathematic relationship of PIM generation.

Passive Intermodulation (PIM) is a growing problem in wireless communications systems. PIM appears as new frequencies 101 created by the mixing of two or more signals in a passive, non-linear device such as a loose RF (Radio Frequency) connector or rusty bolt, as shown in FIG. 1. When these unwanted signals fall inside an operator's uplink band, they raise the system noise floor.

The PIM sources include internal and external PIM sources. The primary sources of PIM sources are internal PIM sources, which are resulted in by the inconsistent metal to metal contacts in high current density regions such as inside transmission lines, inside RF components. These internal PIM sources can be caused by:
  Contaminated surfaces or contacts due to dirt, dust, moisture or oxidation
  Loose mechanical junctions due to inadequate torque, poor alignment or poorly prepared contact surfaces
  Loose mechanical junctions caused by transportation shock or vibration
  Metal flakes or shavings inside RF connections.
  Poorly prepared RF connections, such as trapped dielectric materials, solid inner conductors' distortion, and so on.

On the other hand, external PIM can be caused by loose metal-to-metal junction in the RF path beyond the antenna. Loose or rusty mounting hardware, metal structures near the antenna or metal objects in front of the antenna can be the sources of PIM, especially in small cell applications scenario. Small cell deployments often utilize existing structures such as street lamps and telephone poles to provide coverage at street level. Metal object, such as lamp fixtures, guy wires, power lines and metal support structures, are often located near the site antennas. Since omni-directional antennas are often used for these applications, the metal objects near the antenna are likely to be illuminated with RF power and likely to generate PIM.

In the network design, RF engineers will stringently control the PIM to guarantee the low PIM performance. But due to the environment, corrosion and oxidation of devices, and loose and dirt of connectors, some PIM sources will become faulty. If PIM signals fall in an operator's uplink band can elevate the noise floor, the PIM fault will result in the reduction of network coverage, significantly degrading throughput & QoS (Quality of Service). Especially in multi-operator, multi-technology and multi-band wireless systems, PIM fault has more severely affected, which will require multi-operators to work together to solve the problem. PIM fault also has another negative impact on the customer experience. The higher noise level it causes, the greater Tx power by the mobile device it requires to overcome, which results in shorter battery life of the consumer's mobile. At the minimum, this can lower throughput for that customer—costing operator's potential revenue—and at the maximum this will increase customer churns. This makes the PIM fault more critical to the system performance. Therefore, locating PIM fault source and solving the PIM fault problem is very important for today's wireless networks in both indoor and outdoor scenarios.

There are several existing solutions to find and eliminate the PIM fault sources in RF components.

Figure 2:
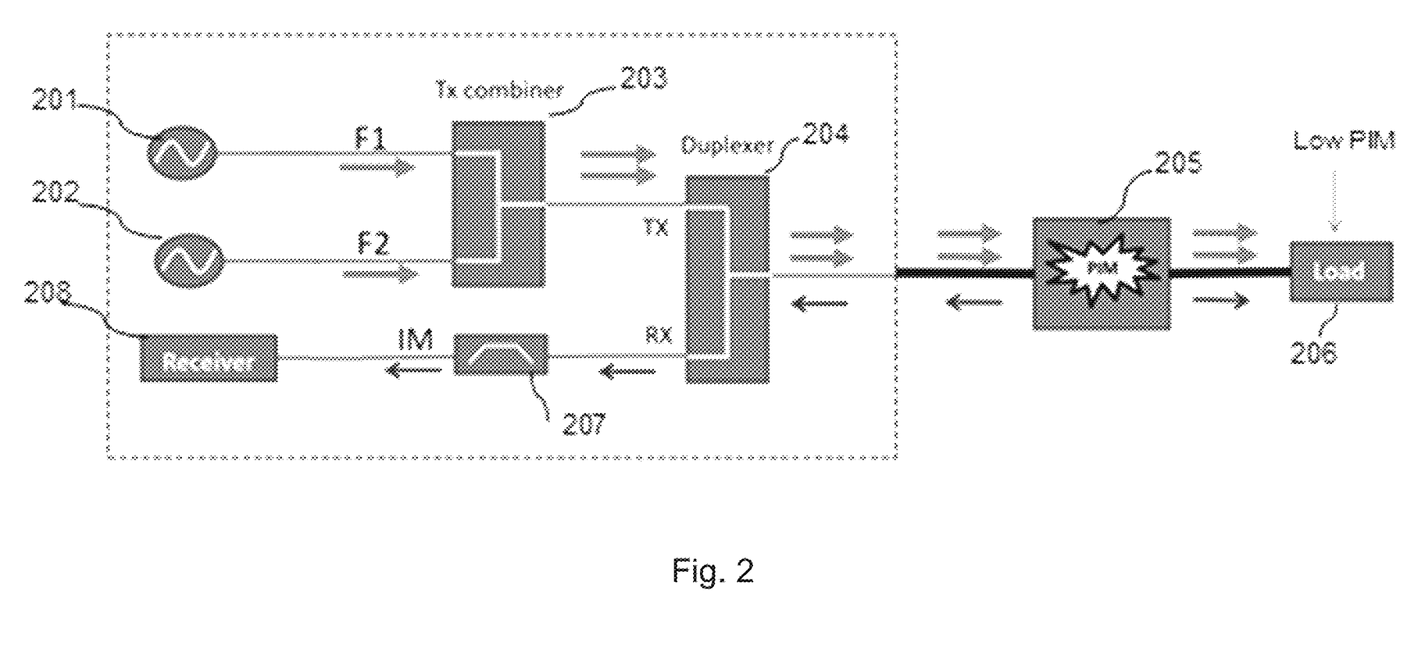
FIG. 2 shows the structure picture of traditional PIM testing method.

The traditional PIM testing/verification is to utilise a PIM testing tool and plug the Tx/Rx port to the deployed system, as shown in FIG. 2. It will then transmit two high power signals 201 and 202 (i.e. 2×20 w or 2×43 dBm) on two different frequency channel (i.e. f1, f2) into a combiner 203, and the TX signal transmits into an equipment 205 via the Duplexer 204. The intermodulation product (3rd, 5th, 7th etc.) will travel back through a low PIM terminations 206. Based on the $3^{rd}$, $4^{th}$, and $7^{th}$ frequency filter 207, the intermodulation product will be received in the uplink.

If some connections or devices 205 have some problems, the engineer will receive a spike (or spikes) on the spectrum. If the PIM spikes while tapping on the connection or device, the engineer is close to the fault source. This approach works well for equipment compliance test before installation or PIM caused by loose connectors and metal flakes in the connectors. For other PIM causes, such as non-linear materials or corrosion/contamination, this method normally won't work.

At the same time, it is relatively easy to tell if a PIM test has failed or not, but not easy to find the exact device or connection that causes the problem. To do that, an engineer needs to test by exclusion method. He will need to test a lot of network parts at different ports before he can finally determine the exact location. It is even more time consuming for a DAS (Distributed Antenna System) as the whole network is normally deployed over the ceiling, and means that good connections might be loosened (and potentially damaged) in the process of locating PIM faults. In addition, this process is not effective for locating PIM sources beyond the antenna.

Distance-to-PIM (DTP) is another solution that eliminates the guesswork, allowing engineers and technicians to quickly and accurately locate PIM fault sources, even when it's beyond the antenna system, which performs a measurement and in second displays the locations of PIM fault sources both in the feed system as well as beyond the antenna.

But, DTP test modes do have limitations that should be considered by users.

Accuracy is dependent on selection of the correct cable velocity factor for the system under test, which may be difficult when multiple cable types are used in the system. In addition, electrically long devices, such as filters and TMA (Tower Mounted Amplifier), can create a large difference in electrical length compared to physical length. DTP algorithms are not able to cope with large interfering signals or large variations in PIM magnitude during the measurement window. If these conditions are present, DTP results may be highly inaccurate, and therefore should not be used as a pass/fail test.

On the other hand, accurately identifying the location of PIM sources beyond the antenna still requires additional testing when using DTP technology.

SUMMARY OF THE INVENTION

According to a first aspect of the present invention there is provided a method for locating the source of a passive intermodulation (PIM) fault in a radio frequency (RF) transmission and receiving system, the method comprising: a) generating a PIM fault fingerprint database by: modelling an RF network; defining a plurality of PIM fault patterns for the modelled RF network by defining PIM faults at one or more sources; simulating a received RF signal for each respective PIM fault pattern; generating the PIM fault fingerprint database in dependence on the simulated received RF signals for each defined PIM fault pattern; b) measuring an RF signal for a real network having a PIM fault and abstracting the measured RF signal to define a given signal; c) searching and matching the given signal using the fingerprint database to determine the PIM fault pattern; and d) locating the source of the PIM fault, or giving a further measuring guideline in dependence on the determined PIM fault pattern.

The method may further comprise: if a further measuring guideline is given, repeating steps (b), (c) and (d) until the source of the PIM fault is located.

Generating the PIM fault fingerprint database may further comprise: a) modelling the operation environment of the RF network; b) defining one output port for each of a plurality of passive sources as a respective signal point in the modelled network; c) defining PIM fault patterns in the modelled network by defining PIM faults at one or more of the plurality of passive sources; d) simulating the transmission and receipt of RF signals for each defined fault pattern; and e) abstracting PIM signal feature vectors in dependence on the simulated received signals for each defined signal point respectively, and storing the PIM fault patterns and the corresponding feature vectors in the fingerprint database as PIM fault signatures for the plurality of passive sources.

Modelling the operation environment of the RF network may comprise modelling one or more of a building structure and materials, outdoor terrain and clutter.

Each PIM fault pattern may be defined as $[0_1, \ldots, 1_i, \ldots, 0_K]$, where an $i^{th}$ source has PIM faults, it is marked as 1, and others are marked as 0, and K is the total number of PIM sources in the modelled network.

PIM signal feature vectors may further include one or more of: a received noise floor, a power level, a spectrum, and an interference.

The PIM fault fingerprint database may further include the PIM fault patterns and feature vectors, and the fingerprint of a $p^{th}$ fault pattern may be represented by $$\mathcal{F}_p = \left\{ [0_1, \ldots, 1_i, \ldots, 0_K]_p, \begin{bmatrix} f_{p,1}(1), f_{p,1}(2), \ldots, f_{p,1}(N) \\ f_{p,2}(1), f_{p,2}(2), \ldots, f_{p,2}(N) \\ \vdots, \vdots, \ddots, \vdots \\ f_{p,K}(1), f_{p,K}(2), \ldots, f_{p,K}(N) \end{bmatrix} \right\}$$

where, in the $p^{th}$ fault pattern, the $i^{th}$ source comprises the defined PIM faults, K is the total number of PIM sources in the modelled network, $f_{p,k}(n)$ is an uplink receive noise floor at the $n^{th}$ sample time, and N is the total sample times.

Abstracting the measured RF signal to define the given signal may further comprise: measuring RF signals at one or more signal points, wherein each signal point is located in an output port of a passive source; abstracting PIM signal feature vectors at a source signal point, wherein the PIM signal feature vectors represent one or more of received noise floor, power level, spectrum and interference; recording the feature vectors for the given signal.

Abstracting the measured RF signal to define the given signal may further comprise: analysing mobile record data in an operation and maintenance mode to abstract PIM signal feature vectors.

The given signal may be represented by $$s = \begin{bmatrix} s_{b_1}(1), s_{b_1}(2), \ldots, s_{b_1}(N) \\ s_{b_2}(1), s_{b_2}(2), \ldots, s_{b_2}(N) \\ \vdots, \vdots, \ddots, \vdots \\ s_{b_{K'}}(1), s_{b_{K'}}(2), \ldots, s_{b_{K'}}(N) \end{bmatrix}$$

where K'(K'≤K) is the number of measured target signal points, $b_{k'}$ denotes the $k'^{th}$ signal point, which can be mapped to one of a total of K signal points, i.e. $b_{k'}=k$, $k \in 1, \ldots, K$.

Searching and matching the given signal using the fingerprint database may comprise using a closest distance algorithm.

The closest distance algorithm may be denoted as:

$$\hat{p} = \underset{p}{\arg\min}\, Dist(\mathcal{F}_p, s)$$

where $\hat{p}$ is an estimated fault pattern, and $\mathcal{F}_p$ is a fingerprint representing a $p^{th}$ PIM fault pattern.

The closest distance algorithm calculation may comprise using a Euclidean distance method.

The Euclidean distance method may be expressed as $$Dist(\mathcal{F}_p, s) = \frac{1}{K'}\sum_{k'=1}^{K'}\left(\frac{1}{N}\sqrt{\sum_{i=1}^{N}(\mathcal{F}_{p,b_{k'}} - s_{k'})^2}\right)$$

where $\mathcal{F}_{p,b_{k'}}$ is a fingerprint representing a $p^{th}$ fault pattern at a $k'^{th}$ signal point, $s_{k'}$ is a given feature vector at the $k'^{th}$ signal point, K'(K'≤K) is the number of measured signal points, where K is the total PIM sources in the network, and N is the total number of sample points.

Locating the source of the PIM fault may further comprise: a) locating the source of a PIM fault; and b) giving a further measuring guideline to further test for other PIM fault sources, measuring an RF signal for a real network and abstracting the measured RF signal to define a given signal, searching and matching the given signal using the fingerprint database to determine another PIM fault pattern, and locating another source of the PIM fault in dependence on the determined PIM fault pattern.

The further measuring guideline may comprise one or more of: a) test procedures, such as test sequence, and test cases; and b) suggestions of parameters configuration, such as frequency, ports, and power.

A measured PIM fault pattern of the located PIM fault source and corresponding PIM signal feature vectors may be retained in the PIM fault fingerprint database as new fingerprints.

According to a second aspect of the present invention there is provided a method for locating passive intermodulation (PIM) source fault in a radio frequency (RF) transmission and receiving system, the method comprising: a) generating a sources' PIM fault fingerprint RF database; b) abstracting the RF signal as the given signal when PIM sources get fault; c) searching and matching between the given signals and the fingerprint database to find the source PIM fault pattern; and d) locating the PIM fault source, or giving the further measuring guideline based on the found fault pattern.

Generating the sources' PIM fault fingerprint RF database may further comprise: a) modelling the wireless network and its operation environment; b) define one output port of each passive source as a signal point (SP) in the modelled network; c) defining passive sources' PIM fault pattern in the modelled network; d) simulating the transmission and receiving RF signal based on all defined fault pattern; and e) abstracting the PIM-related feature vectors at all defined SP, and storing all fault pattern and the corresponding feature vectors into the fingerprint database as source PIM fault signature. Modelling the wireless network and its operation environment may include building structure and materials, outdoor terrain and clutter. Passive sources' PIM fault pattern may be defined as $[0_1, \ldots, 1_i, \ldots, 0_K]$, where the $i^{th}$ source has the PIM faults, it may be marked as 1, and the others may be marked as 0, and K is the total number of PIM sources in the modelled network. PIM-related feature vectors may further include the received noise floor, power level, spectrum, and interference.

The fingerprint database may further include PIM fault pattern, and feature vectors, the fingerprint of $p^{th}$ fault pattern may be $$\mathcal{F}_p = \left\{ [0_1, \ldots, 1_i, \ldots, 0_K]_p, \begin{bmatrix} f_{p,1}(1), & f_{p,1}(2), & \ldots, & f_{p,1}(N) \\ f_{p,2}(1), & f_{p,2}(2), & \ldots, & f_{p,2}(N) \\ \vdots, & \vdots, & \ddots, & \vdots \\ f_{p,K}(1), & f_{p,K}(2), & \ldots, & f_{p,K}(N) \end{bmatrix} \right\}$$

where in the $p^{th}$ fault pattern, the $i^{th}$ source has the PIM faults, K may be the total number of PIM sources in the modelled network, $f_{p,k}(n)$ may be the uplink receive noise floor at $n^{th}$ sample time, and N may be the total sample times.

Abstracting the RF signal as the given signal may further comprise the following step: measuring the RF signals at one or multi signal points (SPs) to abstract the source PIM faults' feature signals, where each signal point locates in the output port of each passive source.

In the real network, the measured RF signal is time-varying. 'Abstracting' may mean analysing the measured RF signal when a PIM fault is present in one or more sources, and finding the common RF signal characteristic. The common RF signal characteristic may be referred to as the given signal. The given signal may be matched with the fingerprint database. In other words, the measured RF signal may be abstracted to determine a common RF signal characteristic that is then searched and matched with the fingerprint database.

Abstracting the RF signal as the given signal may further comprise the following step: analysing the mobile record data in operation & maintenance to abstract the source PIM faults' feature signals.

The given signal may be $$s = \begin{bmatrix} s_{b_1}(1), & s_{b_1}(2), & \ldots, & s_{b_1}(N) \\ s_{b_2}(1), & s_{b_2}(2), & \ldots, & s_{b_2}(N) \\ \vdots, & \vdots, & \ddots, & \vdots \\ s_{b_{K'}}(1), & s_{b_{K'}}(2), & \ldots, & s_{b_{K'}}(N) \end{bmatrix}$$

where K' (K'≤K) may be the number of measured target SPs, $b_{k'}$ may denote the $k'^{th}$ SP, which may be mapped to one of the total K signal points, i.e. $b_{k'}=k$, $k \in 1, \ldots, K$.

The searching and matching between the given signals and the fingerprint database may be a closest distance algorithm. The closest distance algorithm may be denoted as:

$$\hat{p} = \underset{p}{\operatorname{argmin}} Dist(\mathcal{F}_p, s)$$

where $\hat{p}$ may be the estimated fault pattern, $\mathcal{F}_p$ may be the fingerprint of the $p^{th}$ PIM fault pattern. The Euclidean distance method may be used in the closest distance calculation. The Euclidean distance method may be expressed as $$Dist(\mathcal{F}_p, s) = \frac{1}{K'} \sum_{k'=1}^{K'} \left( \frac{1}{N} \sqrt{\sum_{i=1}^{N} (\mathcal{F}_{p,b_{k'}} - s_{k'})^2} \right)$$

where $\mathcal{F}_{p,b_{k'}}$ may be the fingerprint of $p^{th}$ fault pattern at $k'^{th}$ signal point, $s_{k'}$ may be the given feature vector at the $k'^{th}$ signal point, K' (K'≤K) may be the number of measured signal points, where K may be the total PIM sources in the network, and N may be the total number of sample points.

Locating the PIM fault source may further comprise: a) locating the PIM fault source; and b) giving the further test guideline to further test the PIM fault sources. The test guideline may further comprise: a) test procedures, such as test sequence, and test cases; and b) suggestions of parameters configuration, such as frequency, ports, and power. The located PIM fault pattern and corresponding feature vectors may be retained in the database as new fingerprints.

As described herein, this document proposes a method for locating passive intermodulation fault sources based on pre-generated fault fingerprint database, where the solution includes two phases, which are training and location phases, respectively. In the training phase, the fault fingerprints due to the fault of one or multi-PIM sources are used to create the database, the created database is used as reference for the localization in the locating phase. The procedures are described as follows:

Network Modelling and Simulation

The network can be modelled in details. The devices feature (loss, gain, PIM etc.) will be modelled as well as their connections with different cables (i.e. material, length, loss per metre). Such a model will also be able to give the PIM result for each port for a given scenario.

PIM Characteristics and Fingerprint Database

The simulation shall be able to simulate the result when given some of the connections or devices get fault. The characteristics of the PIM result for each source port will be able to generated. Such kind of information will be abstracted to several feature vectors and stored in a database as fingerprints of the corresponding trouble cases.

Search and Match Process

When the engineer tests the PIM result through a given port, or analyses the mobile record data, the proposed method will be able to find the closest case (or cases) to the testing or mobile record results through searching and matching the fingerprint database.

Infer and Retain Process

When the closest case(s) is found, the method will be able to infer exact PIM fault source corresponding the case and the real test result, or can give the test guide for further test and match. At the same time, upgrade the database as new fingerprint based on the test results.

BRIEF DESCRIPTION OF THE DRAWINGS

The present invention will now be described by way of example with reference to the accompanying drawings. In the drawings.

DETAILED DESCRIPTION OF THE INVENTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Hereinafter, the present invention will be further described in detail with reference to the accompanying drawings. The invention is described in connection with wireless communications and more particularly relates to measuring passive intermodulation (PIM) and identifying the location of a source of PIM fault, but the invention is not limited to any embodiment. The scope of the invention is limited only by the claims and the invention encompasses numerous alternatives, modifications and equivalents.

In wireless communication systems, passive intermodulation (PIM) is a form of intermodulation distortion that occurs in components normally thought of as linear, such as cables, connectors and antennas. However, when these non-linear, passive components are subjected to the RF power levels found in cellular systems, they behave like a mixer, generating new frequencies that are mathematical combinations of the downlink frequencies present at the site, as shown in FIG. 1 at 101 and labelled by PIM. PIM generated products will affect received band (UL) by increasing the received noise floor thus reducing base station sites coverage and capacity.

Although in the network design, RF engineers will stringently control the PIM to guarantee the network coverage and capacity, after the network is installed, and the PIM sources can start to fault due to the corrosion and oxidation of devices, loose and dirt at the connectors, and environment, such as cold climate, moisture, and wind. Then, the network performance, such as coverage and capacity, will degrade gradually, and the user experience will be worse increasingly. The situation will be more complex in multi-operator, multi-technology and multi-band wireless systems. Therefore, locating the PIM fault sources is very important for today's wireless networks for both indoor and outdoor scenario.

The present invention provides a method for locating passive intermodulation (PIM) fault based on PIM fingerprint in a radio frequency (RF) transmit/receive system, comprises a two-step process. As a first step, a training phase is performed, which includes modelling a wireless network and creating a fingerprint database with one or multi-PIM sources faults. In the second phase, when the source has PIM fault, testing the PIM signal and matching the signal with the fingerprints in the database. The location of PIM fault source or further test guidance is given in the second phase.

In radio communications, passive sources have a passive intermodulation (PIM) value. When the PIM value of a source increases, the radio communication service may be negatively affected, or even dysfunctional. This occurs when, as referred to herein, "PIM sources get fault". In other words, a source may be said to develop a PIM fault when the PIM value of that source increases above a threshold level such that a radio communication service is negatively affected.

Figure 3:
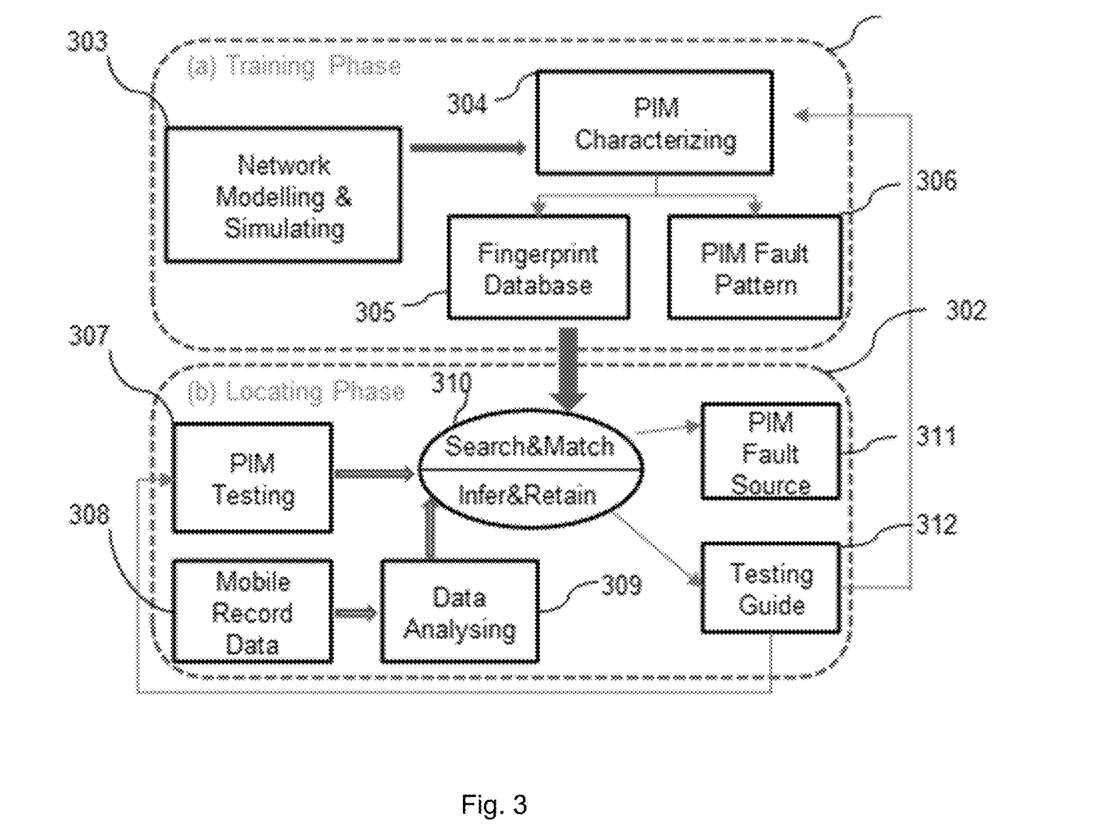
FIG. 3 shows a block diagram of an exemplary system for locating passive intermodulation faults with two-step process.

FIG. 3 shows the block diagram of components of the embodiment of the present invention using fingerprint as a means of determining the location of the PIM fault sources. The solution includes two phases, which are training phase 301 and locating phase 302.

Figure 4:
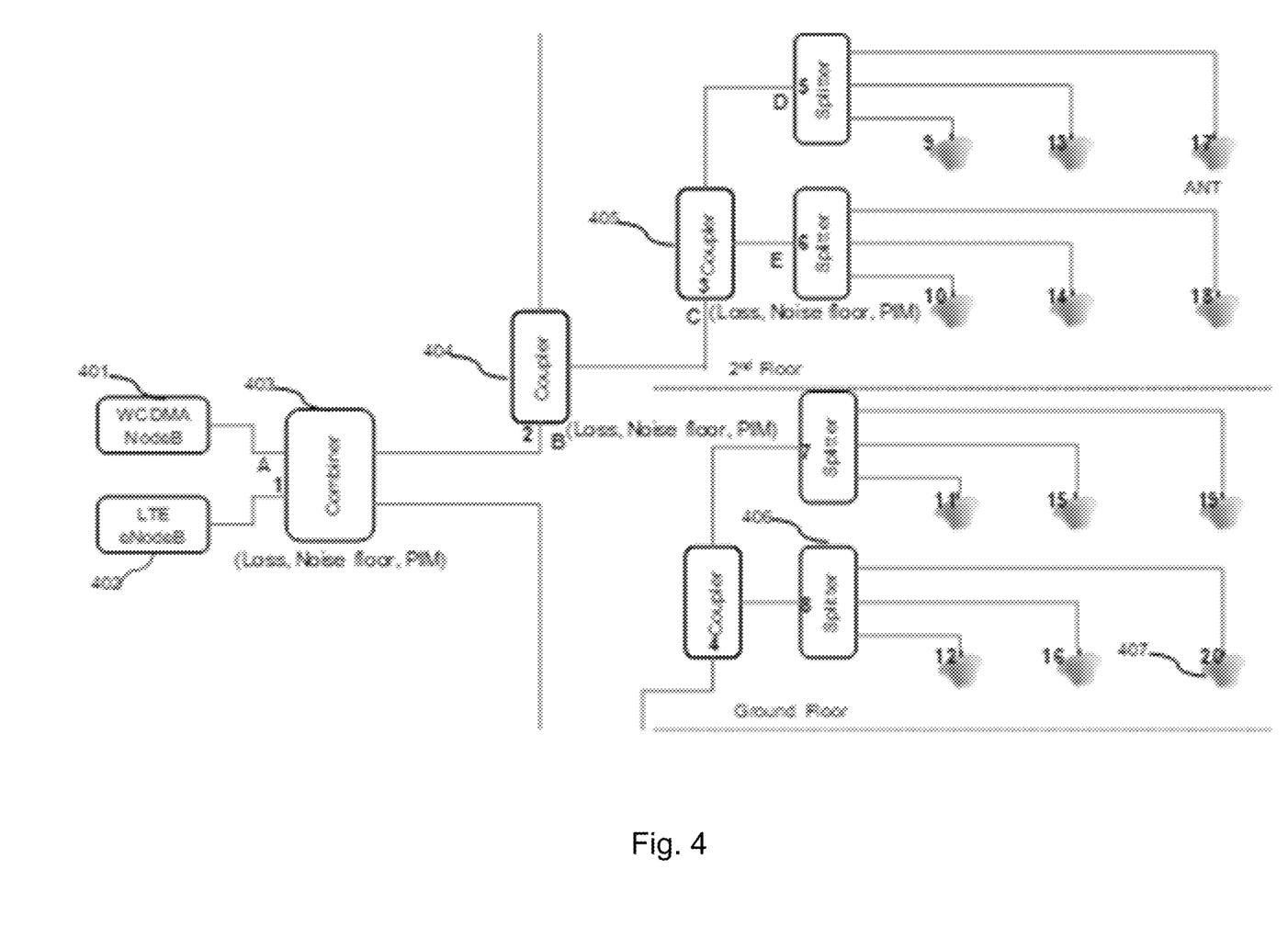
FIG. 4 shows an exemplary system for locating passive intermodulation faults.

In the training phase 301, by using the distributed antenna system (DAS) planning and optimization tool, such as iBuildNet, the communication network and environment can be modelled 303 in detail, that may include building structure and materials, outdoor terrain and clutter, network and connection network external environment, and so on. FIG. 4 shows an indoor DAS system, where multi-technology and multi-band signals share the same network. In the network, the placed devices' features (loss, gain, PIM etc.) will be configured as well as their connections with different cables (i.e. material, length, loss per metre). Such a model shall also be able to give the PIM result of each port for the given scenario.

Based on the link calculation, the link signal transmission and reception can be calculated and simulated 303, so the characteristics of the PIM 304 fault result for each port can be collected, such as noise floor, power level, spectrum, and interference. Such kind of information will be abstracted into the feature vectors to serve as unique fault signatures, and stored in a database as fingerprints 305 of the corresponding trouble case.

Assuming there are K passive sources in the network, and are marked into {1, 2, . . . , K}. For each source, the signal point at the port can be defined where the PIM-related result of source can be tested, so there will be K signal points, as shown in FIG. 4, the signal point is located at the input port of each passive source, and there are total 20 signal points in this case. The uplink Rx noise floor is $f_{p,k}(t)$ after the uplink signal passes the passive source, where t is the time variable. Based on a specific sample time the sampled noise floor can be denoted into $$f_{p,k}=[f_{p,k}(1),f_{p,k}(2),\ldots,f_{p,k}(N)]$$

where p is the fault pattern of passive sources, N is the sample points, and k is the kth signal point. If one or multi passive sources are faulty, the fault pattern p can be denoted into:

$$p=[0_1,\ldots,1_i,\ldots,0_K]$$

i.e. if the $i^{th}$ source has the PIM faults, it is marked as 1, and the others without PIM faults are marked as 0. If there are two sources, $i^{th}$ and $j^{th}$ passive sources, have the PIM faults, the corresponding location will be marked as 1, and the others will be marked as 0, and the pattern is $p=[0_1,\ldots,1_i,\ldots,1_j,\ldots,0_K]$. Therefore, the relationship between PIM fault source and corresponding uplink Rx noise floor at $k^{th}$ signal point can be written as:

$$\mathcal{F}_{p,k}=\{(p,f_{p,k})|[0_1,\ldots,1_i,\ldots,0_K],[f_{p,k}(1),f_{p,k}(2),\ldots,f_{p,k}(N)]\}$$

If the $i^{th}$ passive source gets the fault, i.e. PIM is fault, and the PIM value will increase, that makes the PIM-related value is larger than a fix threshold, where the threshold can be configured into −120 dBm, the noise floor feature vectors at each signal point can be abstracted as $f_{p,k}(t)$. Therefore, the $p^{th}$ fingerprint can be stored as (PIM fault pattern, feature vectors), i.e.

$$\mathcal{F}_p = \left\{[0_1,\ldots,1_i,\ldots,0_K]_p, \begin{bmatrix} f_{p,1}(1), & f_{p,1}(2), & \ldots, & f_{p,1}(N) \\ f_{p,2}(1), & f_{p,2}(2), & \ldots, & f_{p,2}(N) \\ \vdots & \vdots & \ddots & \vdots \\ f_{p,K}(1), & f_{p,K}(2), & \ldots, & f_{p,K}(N) \end{bmatrix}\right\}$$

In the fingerprint database generation, the faults of all passive sources, i.e. connections and devices, should be calculated and the fingerprint should be stored. Assuming there are total P passive source fault patterns, based on all fault pattern P, the fingerprint database $\mathcal{F}$ is $$\mathcal{F}=\{\mathcal{F}_p|p=1,\ldots,P\}$$

At the same time, based on the frequent faults of some passive sources, some fault patterns 306 can be created and saved in the database to constrain the inference of PIM fault sources. For example, in the network, connectors' fault will be up to 60.97%, and jumper cable will be up to 32.26%, and so on. Based on the statistic of PIM faults, the pattern can be used to define the searching and inferring method in the locating phase.

Figure 5:
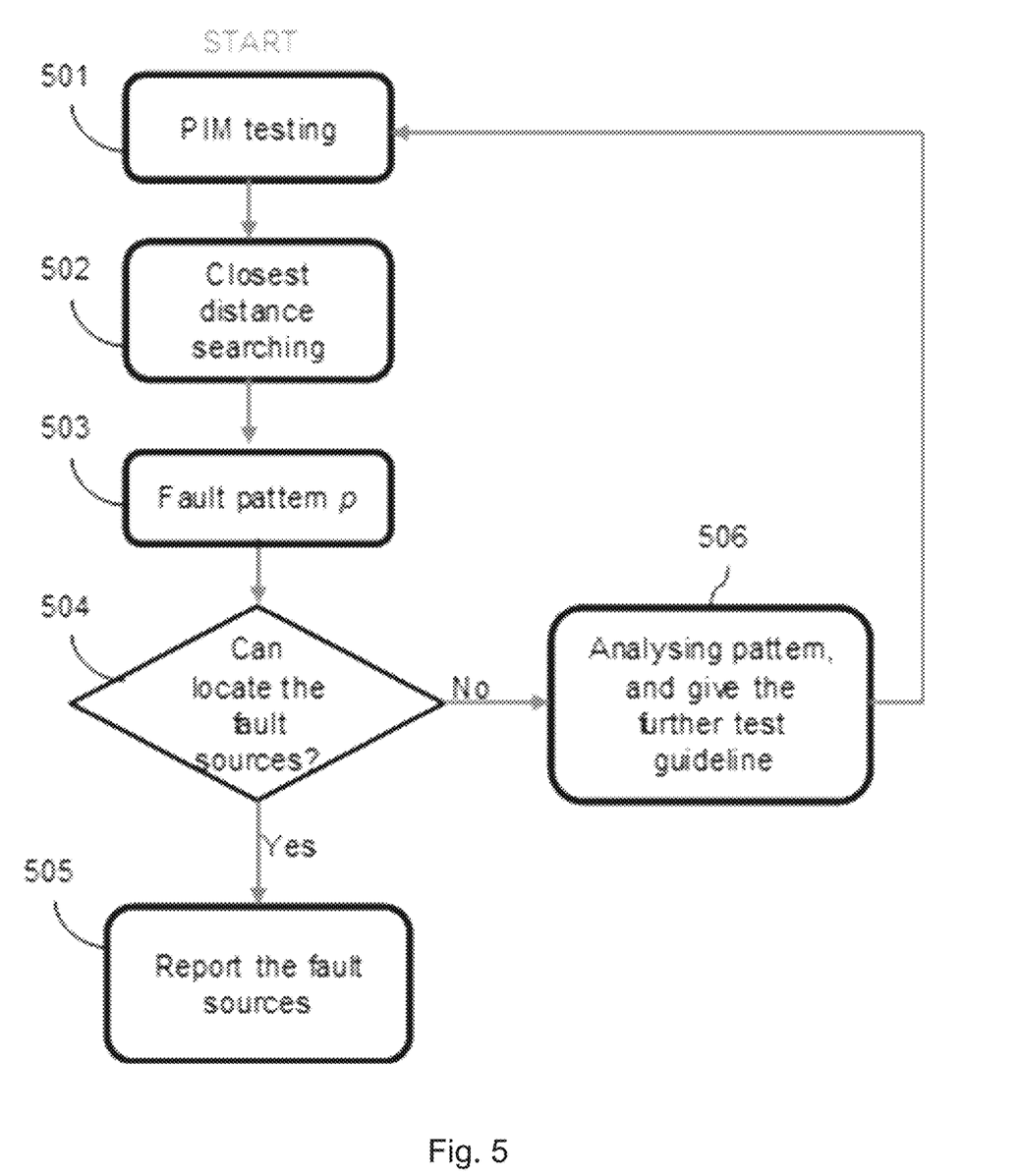
FIG. 5 shows a flow chat of searching and inferring the PIM fault source.

In the locating phase 302, when network performance, such as coverage and capacity, is degraded due to the PIM fault, i.e. the increasing noise floor reduces the network coverage and capacity, a PIM testing 307 for the network will be done, as also shown in 501, and record the signal variation, such as noise floor, interference, and so on. Assuming the tested noise floor at the $k^{th}$ signal point is $s_k(t)$, the N sampled values at the $k^{th}$ signal point can be written as:

$$s_k=[s_k(1),s_k(2),\ldots,s_k(N)]$$

If K' (K'≤K) signal points are measured, the measured vectors can be denoted as $$s = \begin{bmatrix} s_{b_1}(1), & s_{b_1}(2), & \ldots, & s_{b_1}(N) \\ s_{b_2}(1), & s_{b_2}(2), & \ldots, & s_{b_2}(N) \\ \vdots & \vdots & \ddots & \vdots \\ s_{b_{K'}}(1), & s_{b_{K'}}(2), & \ldots, & s_{b_{K'}}(N) \end{bmatrix}$$

where $b_{k'}$ denotes the $k'^{th}$ signal points, which can be mapped to one of the total K signal points, i.e. $b_{k'}=k, k \in 1,\ldots,K$.

When searching and matching 310 the PIM testing results with the fingerprint in the database, a closest case(s) is(are) found, as shown in 502. The closest distance algorithm can be used to locate the PIM source, where the closest distance may be the Euclidean distance. If the minimum distance between the measured vector and the fingerprint is the fault pattern based on one source case, then the PIM fault source 311 can be found; otherwise, based on the fault pattern with minimum distance, a further test guideline 312 can be given to test the specific sources, until the final PIM fault source can be found, as shown in FIG. 5 at 505.

The closest distance of signal space is denoted as Dist(.) function, which can be the Euclidean distance. Therefore, calculate the closest distance between the test vector and the fingerprint as follows:

$$\hat{p} = \arg\min_p Dist(\mathcal{F}_p, s)$$

where $\hat{p}$ is the estimated fault pattern, as shown in 503. In the closest distance calculation, the Euclidean distance method can be expressed as $$Dist(\mathcal{F}_p, s) = \frac{1}{K'}\sum_{k'=1}^{K'}\left(\frac{1}{N}\sqrt{\sum_{i=1}^{N}(\mathcal{F}_{p,b_{k'}} - s_{k'})^2}\right)$$

If the test points are properly selected, the PIM fault source could be located, as shown in 505, otherwise, further test guide is given to position the fault source, as shown in 506, including the guideline (i.e. test procedures) to further test the potential ports (i.e. different powers, frequencies) to minimise the total testing effort, or the test procedure (i.e. test sequence and cases) to exactly locate the fault device and connection. This is as shown by 504. For example, after the matching algorithm, a faults pattern $\{0_1,\ldots,1_i,\ldots,1_j,\ldots,0_K\}$ is obtained, as shown in FIG. 4, if i and j signal points are 5 and 10 at the first floor, respectively, the further signal points C, D, and E need to be measured to abstract the new measured vectors, and test sequence is (C, D, E). Correspondingly, the measured vector is $$s = \begin{bmatrix} s_C(1), s_C(2), \ldots, s_C(N) \\ s_D(1), s_D(2), \ldots, s_D(N) \\ s_E(1), s_E(2), \ldots, s_E(N) \end{bmatrix}$$

and further closest distance of signal space will be calculated, until the final fault source is inferred. The flow chart of searching and inferring the PIM fault source is shown in FIG. 5.

As shown in FIG. 5, the searching an inferring the PIM fault source comprises the following steps. Step 501 shows starting of the PIM testing. Step 502 shows searching the PIM testing results with the fingerprint in the database to search and find the closest case(s). Step 503 shows calculating the estimated fault pattern of those closest case(s). Step 504 shows deciding whether the fault sources can be located based on the calculated fault pattern. Step 505 shows that if the fault sources can be located that the fault sources are reported. Step 506 shows that if the fault sources cannot be located then a further test guideline can be generated based on analysing the generated fault pattern from step 503.

Alternatively, in the network operation & maintenance, user equipment feedback information can also be used to analyse the PIM fault instead of the PIM testing, so the mobile record (MR) data 308 can be used to abstract PIM fault feature vectors by uplink interference data analysis 309, where the uplink SINR (signal to interference plus noise ratio) will significantly increase if the source PIM fault, and the increasing of interference will result in the increasing of noise floor.

Once is finished, the method will be able to determine whether to retain these result as new fingerprints into the database. Next time if similar symptom is met, the method will be able to provide the solution immediately.

A detailed description of the preferred embodiment of the present invention specific or more. It should be understood that one of ordinary skill in the art without creative work to many modifications and variations may be made according to the teachings of the present invention. Therefore, all those skilled in the art under this inventive concept on the basis of prior art technical solutions through logical analysis, reasoning or limited experiments could be obtained, are to be made within the scope of the claims determined.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for locating the source of a passive intermodulation (PIM) fault in a radio frequency (RF) transmission and receiving system, the method comprising:
   a) generating a PIM fault fingerprint database by:
      modelling an RF network;
      defining a plurality of PIM fault patterns for the modelled RF network by defining PIM faults at one or more sources;
      simulating a received RF signal for each respective PIM fault pattern;
      generating the PIM fault fingerprint database in dependence on the simulated received RF signals for each defined PIM fault pattern;
   b) measuring an RF signal for a real network having a PIM fault and abstracting the measured RF signal to define a given signal;
   c) searching and matching the given signal using the fingerprint database to determine the PIM fault pattern, wherein the searching and matching the given signal using the fingerprint database comprises using a closest distance algorithm denoted as:

$$\hat{p} = \underset{p}{\mathrm{argmin}}\, Dist(\mathcal{F}_p, s)$$

where $\hat{p}$ is an estimated fault pattern, $\mathcal{F}_p$ a fingerprint representing a $p^{th}$ PIM fault pattern, and s is the given signal; and
   d) locating the source of the PIM fault, or giving a further measuring guideline in dependence on the determined PIM fault pattern.

2. The method as claimed in claim 1, the method further comprising:
   if a further measuring guideline is given, repeating steps (b), (c) and (d) until the source of the PIM fault is located.

3. The method as claimed in claim 2, wherein generating the PIM fault fingerprint database further comprises:
   a) modelling the operation environment of the RF network;
   b) defining one output port for each of a plurality of passive sources as a respective signal point in the modelled network;
   c) defining PIM fault patterns in the modelled network by defining PIM faults at one or more of the plurality of passive sources;
   d) simulating the transmission and receipt of RF signals for each defined fault pattern; and
   e) abstracting PIM signal feature vectors in dependence on the simulated received signals for each defined signal point respectively, and storing the PIM fault patterns and the corresponding feature vectors in the fingerprint database as PIM fault signatures for the plurality of passive sources.

4. The method as claimed in claim 2, wherein abstracting the measured RF signal to define the given signal further comprises:
   measuring RF signals at one or more signal points, wherein each signal point is located in an output port of a passive source;
   abstracting PIM signal feature vectors at a source signal point, wherein the PIM signal feature vectors represent one or more of received noise floor, power level, spectrum and interference;
   recording the feature vectors for the given signal.

5. The method as claimed in claim 2, wherein locating the source of the PIM fault further comprises:
   a) locating the source of a PIM fault; and
   b) giving a further measuring guideline to further test for other PIM fault sources, measuring an RF signal for a real network and abstracting the measured RF signal to define a given signal, searching and matching the given signal using the fingerprint database to determine another PIM fault pattern, and locating another source of the PIM fault in dependence on the determined PIM fault pattern.

6. The method as claimed in claim 1, wherein generating the PIM fault fingerprint database further comprises:
   a) modelling the operation environment of the RF network;
   b) defining one output port for each of a plurality of passive sources as a respective signal point in the modelled network;

c) defining PIM fault patterns in the modelled network by defining PIM faults at one or more of the plurality of passive sources;
d) simulating the transmission and receipt of RF signals for each defined fault pattern; and
e) abstracting PIM signal feature vectors in dependence on the simulated received signals for each defined signal point respectively, and storing the PIM fault patterns and the corresponding feature vectors in the fingerprint database as PIM fault signatures for the plurality of passive sources.

7. The method as claimed in claim 6, wherein modelling the operation environment of the RF network comprises modelling one or more of a building structure and materials, outdoor terrain and clutter.

8. The method as claimed in claim 6, wherein each PIM fault pattern can be defined as $[0_1, \ldots, 1_i, \ldots, 0_K]$, where an $i^{th}$ source has PIM faults, it is marked as 1, and others are marked as 0, and K is the total number of PIM sources in the modelled network.

9. The method as claimed in claim 6, wherein PIM signal feature vectors further include one or more of: a received noise floor, a power level, a spectrum, and an interference.

10. The method as claimed in claim 1, wherein the PIM fault fingerprint database further includes the PIM fault patterns and feature vectors, and the fingerprint of a $p^{th}$ fault pattern is represented by $$\mathcal{F}_p = \left\{ [0_1, \ldots, 1_i, \ldots, 0_K]_p, \begin{bmatrix} f_{p,1}(1), & f_{p,1}(2), & \ldots, & f_{p,1}(N) \\ f_{p,2}(1), & f_{p,2}(2), & \ldots, & f_{p,2}(N) \\ \vdots, & \vdots, & \ddots, & \vdots \\ f_{p,K}(1), & f_{p,K}(2), & \ldots, & f_{p,K}(N) \end{bmatrix} \right\}$$

where, in the $p^{th}$ fault pattern, the $i^{th}$ source comprises the defined PIM faults, K is the total number of PIM sources in the modelled network, $f_{p,k}(n)$ is an uplink receive noise floor at the $n^{th}$ sample time, and N is the total sample times.

11. The method as claimed in claim 1, wherein abstracting the measured RF signal to define the given signal further comprises:
measuring RF signals at one or more signal points, wherein each signal point is located in an output port of a passive source;
abstracting PIM signal feature vectors at a source signal point, wherein the PIM signal feature vectors represent one or more of received noise floor, power level, spectrum and interference;
recording the feature vectors for the given signal.

12. The method as claimed in claim 1, wherein abstracting the measured RF signal to define the given signal further comprises:
analysing mobile record data in an operation and maintenance mode to abstract PIM signal feature vectors.

13. The method as claimed in claim 1, wherein the given signal is represented by $$s = \begin{bmatrix} s_{b_1}(1), & s_{b_1}(2), & \ldots, & s_{b_1}(N) \\ s_{b_2}(1), & s_{b_2}(2), & \ldots, & s_{b_2}(N) \\ \vdots, & \vdots, & \ddots, & \vdots \\ s_{b_{K'}}(1), & s_{b_{K'}}(2), & \ldots, & s_{b_{K'}}(N) \end{bmatrix}$$

where K' (K'≤K) is the number of measured target signal points, $b_{k'}$ denotes the $k'^{th}$ signal point, which can be mapped to one of a total of K signal points, i.e. $b_{k'}=k$, $k \in 1, \ldots, K$.

14. The method as claimed in claim 1, wherein the closest distance algorithm calculation comprises using a Euclidean distance method.

15. The method as claimed in claim 14, wherein the Euclidean distance method is expressed as $$Dist(\mathcal{F}_p, s) = \frac{1}{K'} \sum_{k'=1}^{K'} \left( \frac{1}{N} \sqrt{\sum_{i=1}^{N} (\mathcal{F}_{p,b_{k'}} - s_{k'})^2} \right)$$

where $\mathcal{F}_{p,b_{k'}}$ is a fingerprint representing a $p^{th}$ fault pattern at a $k'^{th}$ signal point, $s_{k'}$ is a given feature vector at the $k'^{th}$ signal point, K' (K'≤K) is the number of measured signal points, where K is the total PIM sources in the network, and N is the total number of sample points.

16. The method as claimed in claim 1, wherein locating the source of the PIM fault further comprises:
a) locating the source of a PIM fault; and
b) giving a further measuring guideline to further test for other PIM fault sources, measuring an RF signal for a real network and abstracting the measured RF signal to define a given signal, searching and matching the given signal using the fingerprint database to determine another PIM fault pattern, and locating another source of the PIM fault in dependence on the determined PIM fault pattern.

17. The method as claimed in claim 1, wherein the further measuring guideline comprises one or more of:
a) test procedures, such as test sequence, and test cases; and
b) suggestions of parameters configuration, such as frequency, ports, and power.

18. The method as claimed in claim 1, wherein a measured PIM fault pattern of the located PIM fault source and corresponding PIM signal feature vectors are retained in the PIM fault fingerprint database as new fingerprints.

* * * * *